United States Patent
Harpaz et al.

(10) Patent No.: US 10,574,619 B2
(45) Date of Patent: *Feb. 25, 2020

(54) CLUSTER ASSISTED MQTT CLIENT COVERAGE FOR FAT-PIPE CLOUD APPLICATIONS

(71) Applicant: International Business Machines Corporation, Armonk, NY (US)

(72) Inventors: Avraham Harpaz, Haifa (IL); Nir Naaman, Haifa (IL); Yoav Tock, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 322 days.

This patent is subject to a terminal disclaimer.

(21) Appl. No.: 15/396,690

(22) Filed: Jan. 2, 2017

(65) Prior Publication Data

US 2018/0191663 A1    Jul. 5, 2018

(51) Int. Cl.
*H04L 12/58* (2006.01)

(52) U.S. Cl.
CPC .................................. *H04L 51/32* (2013.01)

(58) Field of Classification Search
CPC ......... H04L 51/32; H04L 67/10; H04L 67/42; H04L 67/26; H04L 67/1044
See application file for complete search history.

(56) References Cited

U.S. PATENT DOCUMENTS

| 8,954,504 | B2 | 2/2015 | Banks et al. | |
|---|---|---|---|---|
| 2005/0210109 | A1* | 9/2005 | Brown | G06F 17/30867 709/206 |

(Continued)

FOREIGN PATENT DOCUMENTS

| CN | 104836723 | 8/2015 |
|---|---|---|
| CN | 105245621 | 1/2016 |
| WO | 2009109510 | 9/2009 |

OTHER PUBLICATIONS

Emiliano Casalicchio et al., "Distributed subscriptions clustering with limited knowledge sharing for content-based publish/subscribe systems", Network Computing and Applications, 2007. NCA 2007. Sixth IEEE International Symposium on, Date of Conference: Jul. 12-14, 2007.

*Primary Examiner* — June Y Sison
*Assistant Examiner* — Steven C Nguyen
(74) *Attorney, Agent, or Firm* — G. E. Ehrlich

(57) ABSTRACT

A computer implemented method of improving server coverage of a publish-subscribe cluster of servers, comprising using a cluster comprising a plurality of servers each having hardware processor(s), the cluster is adapted to execute messaging engines of a publish-subscribe service for forwarding a plurality of messages to a plurality of subscribing clients, each message is associated with one of a plurality of topics, wherein distributed subscriptions client(s) applies shared subscriptions for one or more topics through subscription group(s) each comprising a subset of the subscribing clients, monitor shared subscriptions made by the subscription group(s) to each of the messaging engines for each topic, generate a shared subscriptions information for each topic by analyzing the shared subscriptions and publish the shared subscriptions information to the clients to allow client(s) of the subscription group(s) to subscribe for the topic(s) on a preferred messaging engine to improve a server coverage of their subscription group.

18 Claims, 4 Drawing Sheets

(56) References Cited

U.S. PATENT DOCUMENTS

2017/0332421 A1* 11/2017 Sternberg .............. H04W 76/11
2018/0167476 A1* 6/2018 Hoffner .................. H04L 67/26

* cited by examiner

CLUSTER ASSISTED MQTT CLIENT COVERAGE FOR FAT-PIPE CLOUD APPLICATIONS

RELATED APPLICATION

This application is related to co-filed, co-pending and co-assigned U.S. patent application entitled "MQTT CLUSTER SHARED SUBSCRIPTION HUB FOR FAT-PIPE CLOUD APPLICATIONS" by Yoav TOCK, Nir NAAMAN, and Avraham HARPAZ, the contents of which are incorporated herein by reference in their entirety.

FIELD AND BACKGROUND OF THE INVENTION

The present invention, in some embodiments thereof, relates to a publish-subscribe service and, more particularly, but not exclusively, to assisting shared subscriptions clients to improve their distribution over a plurality of servers of a cluster providing a publish-subscribe service.

Publish-subscribe is a popular communication paradigm allowing users that produce and consume messages to interact with each other in a decoupled fashion. A typical implementation of this paradigm is topic-based publish-subscribe in which the messages are classified according to topics. In the topic-based publish-subscribe, message producers, also called "publishers" (publishing clients), publish their messages on logical channels called "topics". Message consumers, also called "subscribers" (subscribing clients), subscribe to the topics that are of interest to them, and receive messages published on those topics of choice. Publishers and subscribers are decoupled because they don't need to know the network address of one another, only the topic identifier on top of which they communicate.

Due to its simple interface and inherent scalability, publish-subscribe is commonly used to support many-to-many communication in a wide variety of popular Internet applications, such as, for example, enterprise application integration, stock-market monitoring engines, RSS feeds, on-line gaming and/or the like. There are numerous implementations of the publish-subscribe middleware in both industry, for example, IBM® WebSphere Message Queue (IBM-WMQ), IBM® MessageSight(IBMMS), RabitMQ, Apache Kafka and academia, for example, Corona.

One publish-subscribe protocol in wide use may be, for example, the Message Queue Telemetry Transport (MQTT) used mainly for the "Internet of Things" (IoT) and Machine-to-Machine (M2M) applications. Another popular publish-subscribe protocol is the Java Messaging Service (JMS) which is used mainly for enterprise application integration and/or the like.

SUMMARY OF THE INVENTION

According to an aspect of some embodiments of the present invention there is provided a computer implemented method of improving server coverage of a publish-subscribe cluster of servers by publishing shared subscriptions information to a plurality of clients, comprising using a cluster comprising a plurality of servers each having one or more hardware processor, the cluster is adapted to:

Execute, on the plurality of servers, a plurality of messaging engines of a publish-subscribe service for forwarding a plurality of messages to a plurality of subscribing clients. Each of the plurality of messages is associated with one of a plurality of topics. One or more distributed subscriptions clients applies shared subscriptions for one or more of the plurality of topics through one or more subscription groups each comprising a subset of the plurality of subscribing clients.

Monitor a plurality of shared subscriptions made by the one or more subscription groups to each of the plurality of messaging engines for each of the one or more topics.

Generate a shared subscriptions information for the one or more topics by analyzing the plurality of shared subscriptions.

Publish the shared subscriptions information to the plurality of clients to allow one or more clients of the one or more subscription groups to subscribe for the one or more topics on a preferred messaging engine of the plurality of messaging engines in order to improve a server coverage of the one or more subscription groups.

According to some embodiments of the invention, each of the plurality of messages is received by the plurality of messaging engines from one or more publishing clients. Each of the publishing clients is a member selected from a group consisting of: a device and a publishing application.

According to some embodiments of the invention, the one or more distributed subscriptions clients subscribes to one or more of the a plurality of messaging engines through the one or more subscription groups in order to increase a message consumption of the one or more distributed subscriptions clients.

According to some embodiments of the invention, the one or more distributed subscriptions clients is a fat pipe application consuming a large number of the plurality of messages.

According to some embodiments of the invention, each client of the subset is an application instance of the one or more distributed subscriptions clients.

According to some embodiments of the invention, the publish-subscribe service supports subscription using a wildcard topic filter in which only a portion of the topic may be used by one or more of the subscribing clients to subscribe to a plurality of topics sharing the portion.

According to some embodiments of the invention, the publish-subscribe service is an MQTT (Message Queue Telemetry Transport) service used for a plurality of Internet of Things (IoT) applications.

According to some embodiments of the invention, the shared subscriptions information is published through one or more retained system topics to be available to a newly subscribed subscribing client of the plurality of subscribing clients.

According to some embodiments of the invention, the shared subscriptions information includes cluster membership information indicating which of the plurality of servers is a member of the cluster.

According to some embodiments of the invention, the shared subscriptions information includes a subscription name (subname) information indicating a number of current subscriptions of each of the one or more subscription groups to each of the plurality of messaging engines for the each topic.

According to some embodiments of the invention, the subscription information further comprising an application subscription information indicating a number of current shared subscriptions of each of the one or more subscription groups to each of the plurality of messaging engines for each topic.

According to some embodiments of the invention, each client of the one or more subscription group subscribes to one of the plurality of messaging engines using a client identification information constructed of one or more of a plurality of identification sub-fields to assign a unique identification to each client.

According to some embodiments of the invention, each of the plurality of sub-fields is a member of a group consisting of: an application type, an organization name, an application name and an application instance identification number.

According to some embodiments of the invention, one or more of the subscribing clients of the one or more subscription groups selects the preferred messaging engine by employing one or more heuristics computation methods.

According to some embodiments of the invention, the subscription information comprises a load information indicating a load of messages associated with the one or more topics for the one or more subscription groups for each of the plurality of messaging engines.

According to some embodiments of the invention, one or more subscribing clients of the one or more subscription groups subscribes to one of the plurality of messaging engines according to the load information to balance the load of messages over the plurality of messaging engines.

According to an aspect of some embodiments of the present invention there is provided a system for improving server coverage of a publish-subscribe cluster of servers by publishing shared subscriptions information to a plurality of clients, comprising a cluster comprising a plurality of servers each having one or more hardware processors adapted for executing code stored in a program store, the code comprising:

Code instructions for executing, on the plurality of servers, a plurality of messaging engines of a publish-subscribe service for forwarding a plurality of messages to a plurality of subscribing clients. Each of the plurality of messages is associated with one of a plurality of topics. Wherein one or more distributed subscriptions clients applies shared subscriptions for one or more of the plurality of topics through one or more subscription groups comprising a subset of the plurality of subscribing clients.

Code instructions for monitoring a plurality of shared subscriptions made by the one or more subscription groups to each of the plurality of messaging engines for each of the one or more topics.

Code instructions for generating a shared subscriptions information for the one or more topics by analyzing the plurality of shared subscriptions.

Code instructions for publishing the shared subscriptions information to the plurality of subscribing clients to allow one or more of clients of the one or more subscription groups clients to subscribe for the one or more topics on a preferred messaging engine of the plurality of messaging engines in order to improve a server coverage of the one or more subscription groups.

According to an aspect of some embodiments of the present invention there is provided a computer program product for improving server coverage of a publish-subscribe cluster of servers by publishing shared subscriptions information to a plurality of clients, comprising:

A non-transitory computer readable storage medium.

First program instructions for executing, on a cluster comprising a plurality of servers, a plurality of messaging engines of a publish-subscribe service for forwarding a plurality of messages to a plurality of subscribing clients. Each of the plurality of messages is associated with one of a plurality of topics. Wherein one or more distributed subscriptions clients applies shared subscriptions for one or more of the plurality of topics through one or more subscription groups comprising a subset of the plurality of subscribing clients.

Second program instructions for monitoring a plurality of shared subscriptions made by the one or more subscription groups to each of the plurality of messaging engines for each of the one or more topics.

Third program instructions for generating a shared subscriptions information for the one or more topics by analyzing the plurality of shared subscriptions.

Fourth program instructions for publishing the shared subscriptions information to the plurality of clients to allow one or more clients of the one or more subscription groups to subscribe for the one or more topics on a preferred messaging engine of the plurality of messaging engines to improve a server coverage of the one or more subscription groups.

Wherein the first, second, third and fourth program instructions are executed by one or more processors of the cluster from the non-transitory computer readable storage medium.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
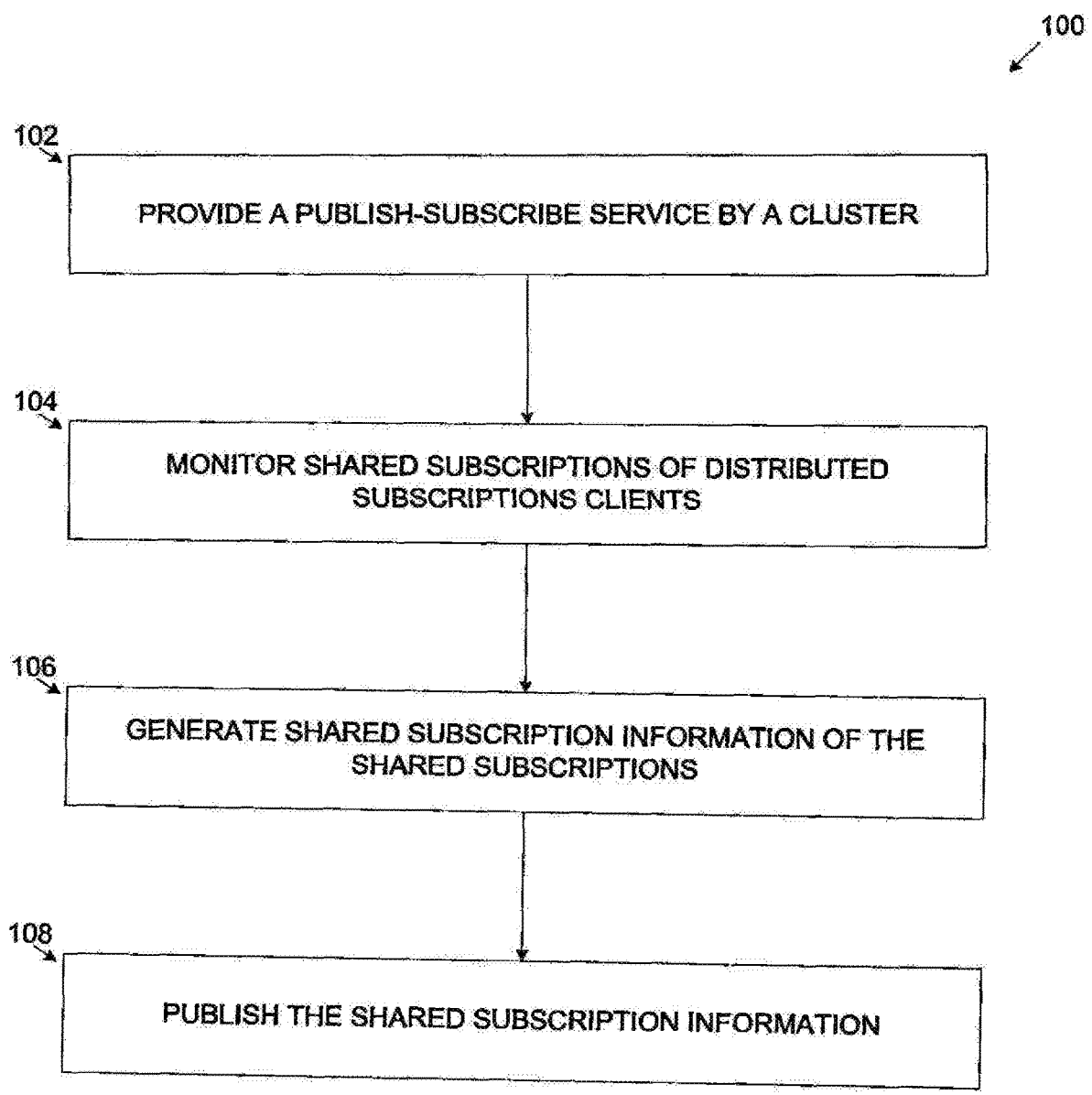
FIG. 1 is a flowchart of an exemplary process for improving server coverage of a publish-subscribe cluster by providing shared subscriptions information to a plurality of shared subscriptions clients, according to some embodiments of the present invention.

The present invention, in some embodiments thereof, relates to a publish-subscribe service and, more particularly, but not exclusively, to assisting shared subscriptions clients to improve their distribution over a plurality of servers of a cluster providing a publish-subscribe service.

According to some embodiments of the present invention, there are provided methods, systems and computer program products for managing a topic-based publish-subscribe cluster to provide means for one or more of a plurality of subscribing clients, in particular distributed subscriptions clients for improving their server coverage. The publish-subscribe cluster comprising the plurality of servers (brokers), for example, a server, a processing node, a virtual processing node and/or the like serves a plurality of publishing and/or subscribing clients, for example, a device, an application, a service and/or the like. Each of the servers executes one or more messaging engines for forwarding messages received from one or more of the plurality of publishing clients to one or more of the plurality of subscribing clients according to their subscription to topics. The topics may include, for example, a subject, a field of interest, a group of publishing devices and/or the like that are available by the publish-subscribe service. The distributed subscription clients are subscribing clients that may subscribe for a specific topic at the publish-subscribe cluster through a plurality of shared subscriptions clients in order to increase their message consumption capacity. The distributed subscription clients may employ one or more subscription groups each comprising a plurality of shared subscriptions clients. The distributed subscription clients may be, for example, an application, in particular a distributed application, a service and/or the like while the shared subscription clients may typically be application instances instantiated by the respective distributed subscriptions client. The messages associated with topics that the subscription group shared subscriptions clients are subscribed for are forwarded to the distributed subscriptions client through the plurality of shared subscriptions clients such that each message is forwarded (dispatched) only once to one of the shared subscriptions clients. This may significantly increase the message consumption capacity of the distributed subscriptions client since the messages stream may be distributed over the plurality of shared subscriptions clients. The server coverage reflects the distribution of the plurality of shared subscriptions over the plurality of servers of the cluster. Since the messages may be published by publishing clients connected to each of the plurality of servers, it is desired that the shared subscriptions are distributed over all the servers or at least over the servers on which messages are published for the topics the subscription group clients are subscribed for.

The messaging engine(s) may monitor shared subscriptions made to the cluster by the shared subscriptions clients of the subscription group(s). The shared subscription information may present one or more aspects, characteristics and/or attributes of the shared subscriptions, for example, a number of subscriptions per subscription group, a distribution of the shared subscriptions over the servers, message queue per topic and/or the like. The messaging engine(s) may publish the collected shared subscriptions information to the subscribing clients, in particular to the shared subscriptions clients. In addition to the shared subscriptions information collected by monitoring the shared subscriptions made to the publish-subscribe cluster, the shared subscriptions information may further include information on the deployment, architecture and/or availability of the server(s) of the publish-subscribe cluster, for example, number of servers in the cluster, servers' identification, servers' access information and/or the like. The shared subscriptions clients may use the published shared subscriptions information to identify the server coverage of their respective subscription group(s) and select accordingly which server(s) to connect to in order to improve distribution of the subscription group(s) over the plurality of servers, i.e. to improve the server coverage.

The messaging engine(s) may publish the collected shared subscriptions information as part of the publish-subscribe service, for example, as one or more system topics that may be available to the subscribing clients.

In some embodiments, the publish-subscribe cluster provides a publish-subscribe service middleware for MQTT. However, this may not be construed as limiting since the present invention may be applied to one or more other publish-subscribe services middleware.

The presented publish-subscribe cluster may exhibit significant advantages in delivering an efficient publish-subscribe service to the subscribing clients, in particular to the distributed subscriptions client(s). While the publish-subscribe service may be provided by a single server (processing node), many publish-subscribe applications, platforms and/or services may need to handle extremely large numbers of messages received from constantly growing numbers of publishing clients and forward (dispatch) the messages to many subscribing clients. In order to be able to maintain an efficient service for such a heavy load platform, a publish-subscribe service may typically be provided by the publish-subscribe cluster comprising a plurality of servers, either geographically co-located and/or distributed over a plurality of locations. One of the main problems arising from the cluster architecture is that while the subscribing clients may connect to any server of the publish-subscribe cluster, every message published on a given topic by one of the publishing clients connected to one server, must be received by all the subscribing clients subscribed to the respective topic, regardless of the server the subscribing clients are connected to. This means that every message may need to be broadcasted to one or more of the other servers to verify all subscribing clients receive the published message. This problem may be coupled with another problem of the publish-subscribe services in which the distributed subscriptions client(s) is a "fat pipe" application(s), for example, an IoT application, that needs to consume vast amounts of messages received from an extremely large number of publishing clients, for example, IoT devices. In order to be able to efficiently consume the large numbers of messages, the fat pipe application(s) may typically apply shared subscriptions using one or more subscription groups each comprising a plurality of shared subscription clients to simultaneously consume the relevant messages. The shared subscriptions clients should be able to receive the relevant messages for their subscribed topics regardless of the server of the cluster that they are connected to. The server coverage of the shared subscription clients over the servers may typically be sub-optimal, i.e. the shared subscriptions clients of a certain subscription group may not be optimally distributed over the plurality of servers. This may enforce the messages to be transferred between the servers of the cluster to deliver the messages from the originating server on which a respective message is published to all the server(s) to which subscribing clients subscribed for the topic of the respective message are connect. There is therefore an incentive to achieve optimal distribution of the shared subscriptions clients over the servers (server coverage) in order to maintain service quality and/or low latency.

Some currently existing publish-subscribe services may apply one or methods to deal with the two problems, for example, forward messages between the servers of the cluster in order to dispatch locally received messages, published by the locally connected publishing client(s), to subscribing clients connected to another server(s). Forwarding the messages may be done by broadcasting every received message to the other servers in the cluster such that each server may identify relevant messages that need to be delivered to one or more subscribing clients connected to the server. This method may significantly overload the network(s) connecting the cluster's servers and may not support scaling the service to serve high numbers of clients. Another method that may be used by the existing publish-subscribe services may be maintaining routing maps at each of the servers of the cluster. The routing tables may hold routing rules for routing each message to each subscribing client according to its topic subscription(s). This method may also present significant drawback since the routing tables need to be constantly updated in order to detect changes in the service, for example, new subscribing clients, disconnected clients, new topics, and/or the like.

While the existing publish-subscribe services may apply techniques to overcome the problems induced by the sub-optimal server overage, the presented publish-subscribe cluster may provide means to improve the server coverage of the shared subscriptions in the first place thus avoiding and/or at least reducing the effects of sub-optimal server coverage. By enabling the shared subscriptions clients to better distribute over the plurality of the servers of the cluster, the presented publish-subscribe cluster may significantly increase the serviceability, efficiency and/or reduce latency for the publish subscribe service, in particular for the fat pipe handling applications employing the plurality shared subscriptions. The presented publish-subscribe cluster and/or method may significantly reduce the servers' resources, for example, computation resources, storage resources and/or networking resources required at each of the plurality of servers since a significantly lower traffic volume needs to be transferred between the servers by avoiding and/or reducing messages transfer between the servers. Furthermore, no routing tables may be maintained by the servers, thus further reducing consumption of the servers' resources.

Using the shared subscriptions information collected, exposed and published by the presented publish-subscribe cluster, the shared subscriptions clients of the distributed subscriptions client may identify the distribution of their respective subscription group(s) over the servers of the cluster. The shared subscriptions clients may select accordingly the server to which to connect in order to improve the server coverage of their respective subscription group(s). The improved server coverage may significantly contribute to scaling the messages dispatching since the shared subscriptions clients may be connected to each of the cluster servers (cover the entire cluster) and may be directly forwarded with relevant messages published locally at each of the servers thus avoiding the need to forward the messages to the other servers. Moreover, the shared subscribing clients of each subscription group may use the load information available through the shared subscriptions information indicating the load of messages published on each of the servers by publishing clients local to the respective server per topic. The shared subscribing clients may connect accordingly to the servers thus allowing for improved load balancing of the messages consumption of the subscription group(s) shared subscriptions clients. Furthermore, using the shared subscriptions information, the distributed subscriptions client(s) may divert, disconnect and/or reconnect shared subscriptions clients to move the shared subscriptions clients from loaded servers to less loaded servers in order to improve messages consumption of the shared subscriptions clients.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process for improving server coverage of a publish-subscribe cluster by providing shared subscriptions information to a plurality of shared subscription clients, according to some embodiments of the present invention. A process 100 may be executed by of a publish-subscribe cluster comprising one or more servers (brokers), for example, a server, a processing node, a virtual machine and/or the like providing a topic-based publish-subscribe service to a plurality of clients, for example, a device, an application, a service and/or the like. The publish-subscribe cluster may execute the process 100 to provide means to one or more subscribing clients, in particular shared subscriptions clients to improve their shared subscriptions coverage (connection) over the plurality of the servers by publishing shared subscriptions information.

The server(s) executing one or more messaging engines may forward messages from a plurality of publishing clients to one or more subscribing clients. The messages may be arranged by topics such that each of the messages is associated with one or more of a plurality of topics, for example, a subject, a field of interest, a group of publishing devices and/or the like that are available by the topic-based publish-subscribe service as is known in the art. For each topic, the messaging engine(s) forward (dispatch) messages associated with the respective topic to all the subscribing client(s) that subscribed for the respective topic. One or more distributed subscription clients may apply shared subscriptions using one or more subscription groups each comprising a plurality of shared subscription clients subscribed to the same topic. The distributed subscription clients may be, for example, an application, in particular a distributed application, a service and/or the like while the shared subscription clients may typically be application instances instantiated by the respective distributed subscriptions client (distributed application).

The server(s) monitor a plurality of subscriptions made by the subscribing clients to the topics, in particular the shared subscriptions clients, and collect shared subscriptions information relating to the shared subscriptions. The shared subscriptions information may include, for example, a shared subscriptions topic(s), a number of shared subscriptions made per topic per server, a number of shared subscriptions made by each subscription group per server, a number of shared subscriptions made by each subscription group per server per handling application name, a subscription group identification, a number of instances of the shared subscriptions applications and/or the like.

The server(s) may expose, by publishing to the publish-subscribe service, the collected shared subscriptions information as part of the publish-subscribe service, for example, as one or more system topics that may be available to the subscribing clients. As part of the shared subscriptions information the server(s) may further publish information on the deployment, architecture and/or availability of the server(s) constituting the publish-subscribe cluster, for example, a number of servers in the cluster, an identification of the servers, an access address, an access port and/or the like.

By providing the shared subscriptions information, the publish-subscribe cluster may allow one or more of the subscribing clients, in particular the shared subscriptions clients to use the shared subscriptions information to select which server to connect to in order to improve the distribution of their shared subscriptions over the plurality of servers to achieve better server coverage.

Figure 2:
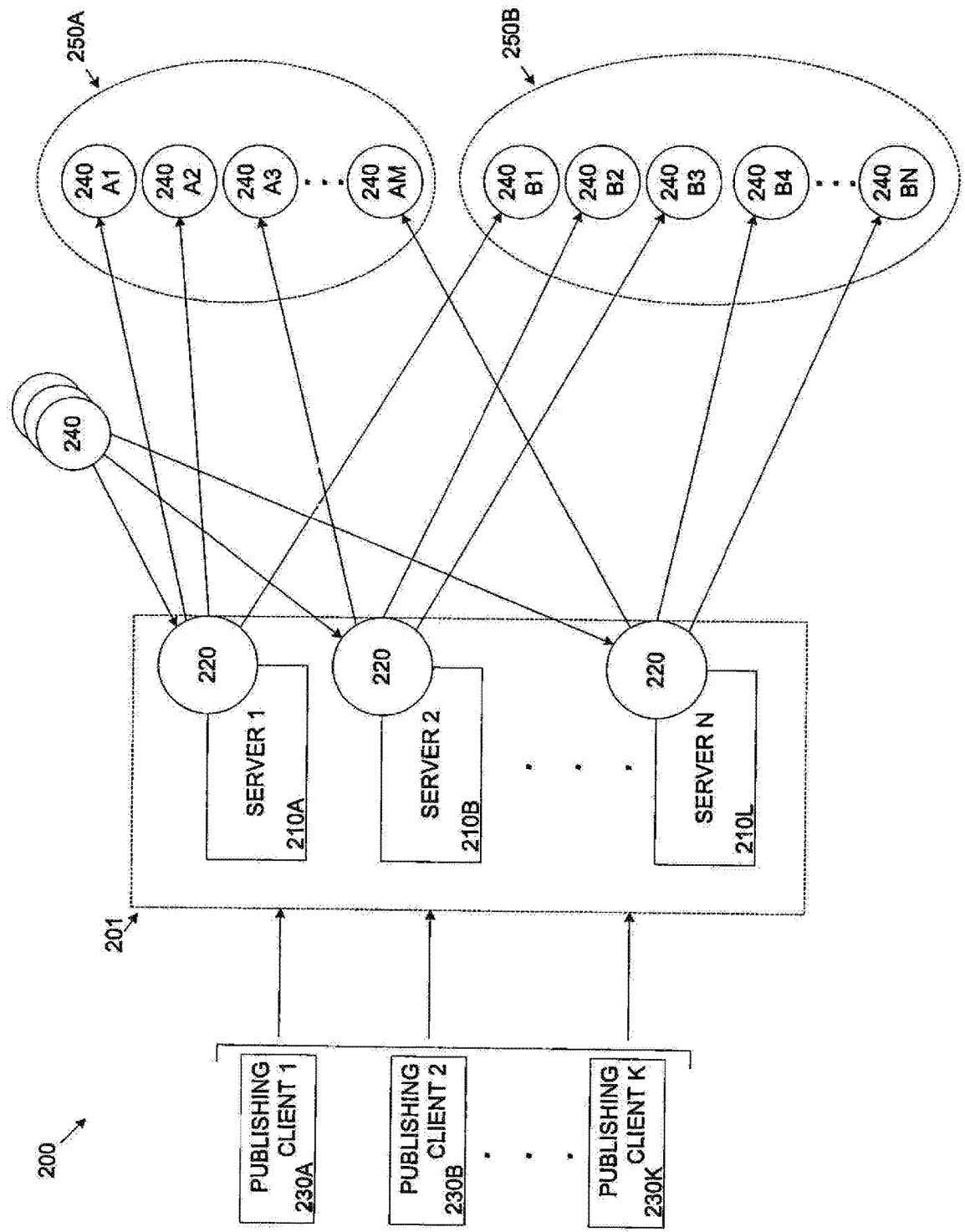
FIG. 2 is a schematic illustration of an exemplary system for improving server coverage of a publish-subscribe cluster by providing shared subscriptions information to a plurality of shared subscriptions clients, according to some embodiments of the present invention.

Reference is also made to FIG. 2, which is a schematic illustration of an exemplary system for improving server coverage of a publish-subscribe cluster by providing shared subscriptions information to a plurality of shared subscription clients, according to some embodiments of the present invention. A publish-subscribe system 200 includes a publish-subscribe cluster 201 providing the publish-subscribe service middleware, for example, IBMWMQ, IBMMS, TIBCO, MQTT, JMS and/or the like. The publish-subscribe cluster 201 may comprise a plurality of servers (brokers) 210 each executing one or more messaging engines 220. The messaging engine(s) 220 forward messages received from one or more of a plurality of publishing clients 230 to one or more of a plurality of subscribing clients 240. Each of the servers 210, for example, a server, a processing node, a virtual machine and/or the like comprises one or more processing nodes each having one or more processors (homogenous or heterogeneous), which may be arranged for parallel processing, as clusters and/or as one or more distributed core processing units. Each of the processor(s) may execute one or more software modules, for example, the messaging engine 220, wherein a software module refers to a plurality of program instructions stored in a non-transitory medium and executed by the processor(s). The servers 210 may be geographically co-located and/or distributed over a plurality of locations. The servers 210 may communicate with each other over one or more networks, for example, a LAN, a WAN, the internet and/or the like. Additionally and/or alternatively, the servers 210 may communicate with each other over one or more fabrics facilitating the infrastructure of the publish-subscribe cluster 201 and/or a part thereof, for example, InfiniB and.

The publishing clients 230*k* (k=A, B, . . . K) such as, for example, a publishing client 230A, a publishing client 230B and so forth through a publishing client 230K publish messages to the messaging engines 220 at the servers 210*l* (l=A, B, . . . L), for example, a server 210A, a server 210B and so forth through a server 210L. Each publishing client 230k may be, for example, a device, an application, a service and/or the like that publishes data and/or information through messages to the publish-subscribe cluster 201 to be available to one or more subscribing clients 240. The publishing device may be, for example, an IoT device, for example, a sensor, a controller, a smart device and/or the like that publishes data it collects on the publish-subscribe cluster 201. The publishing application may be, for example, an enterprise application, for example, JMS, MQTT and/or the like, a publishing service and/or the like.

The present invention focuses on shared subscriptions applied by one or more distributed subscriptions clients, for, example, an application, i.e. a handling application, for example, fat pipe applications, a service and/or the like. The distributed subscriptions clients, for example, applications residing on the back-end or the cloud side of an IoT system, M2M applications, organization infrastructure applications and/or the like, may consume extremely high volumes of messages. The high consumption handling applications may need to consume the large numbers of the messages as they may subscribe to multiple topics, subscribe through wide wild-card topic filters subscriptions and/or the like. The wildcard topic filtering allows the subscribing clients 240 to subscribe to a plurality of topics through a single subscription by using only a portion of the topic.

In order to handle the large number of messages, the distributed subscriptions clients may subscribe to the messaging engine(s) 220 through one or more subscription groups 250, for example, a subscription group 250A and/or 250B each comprising a plurality of shared subscriptions clients 240 constituting a subset of the plurality of subscribing clients 240. For example, the subscription group 250A may include one or more shared subscriptions clients 240Am (m=0, 1, . . . M) and the subscription group 250B may include one or more shared subscriptions clients 240Bn (n=0, 1, . . . N). This means that the respective distributed subscriptions client employing the subscription group 250A subscribes to the messaging engine(s) 220 through M shared subscriptions clients, for example, a shared subscriptions client 240A1, a shared subscriptions client 240A2, a shared subscriptions client 240A3 and so forth through a shared subscriptions client 240AM. Similarly, a respective distributed subscriptions client employing the subscription group 250B subscribes to the messaging engine(s) 220 through N shared subscriptions clients, for example, a shared subscriptions client 240B1, a shared subscriptions client 240B2, a shared subscriptions client 240B3, a shared subscriptions client 240B4 and so forth through a shared subscriptions client 240BN.

The subscription group 250 may be applied by the respective distributed subscriptions client, for example, the handling application through, for example, instantiation of a plurality of instances of the respective handling application. Additionally and/or alternatively, the subscription group 250 may be applied through multiple subscriptions made by the respective distributed subscriptions client itself and/or the like. Typically, not only receiving the published messages burdens the distributed subscriptions client but also processing them. Therefore the plurality of instances may be instantiated to allow fast and/or efficient consumption and/or processing of the received messages. For brevity, the shared subscriptions clients as described herein after are applied using the plurality of instances however other shared subscriptions implementations may apply.

Before further describing some embodiments of the present invention the concept of shared subscriptions is first described.

Figure 3A:
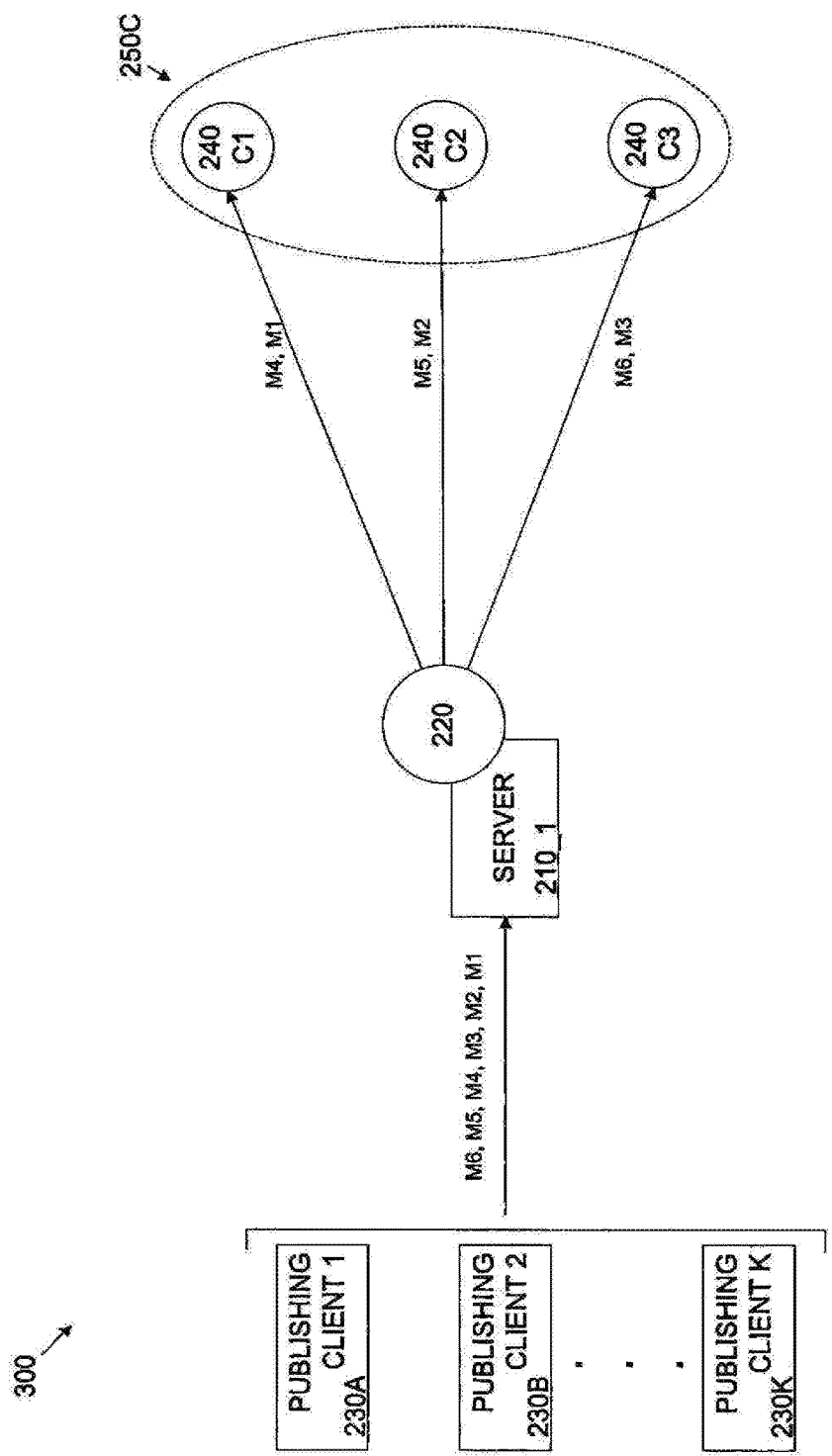
FIG. 3A is a schematic illustration of an exemplary publish-subscribe system supporting shared subscriptions.

Reference is now made to FIG. 3A, which is a schematic illustration of an exemplary publish-subscribe system supporting shared subscriptions. An exemplary publish-subscribe system 300 comprises a single server 210_1 such as the server 210 executing one or more messaging engines such as the messaging engine 220. The messaging engine(s) 220 forward a plurality of messages M, for example, M1, M2, M3, M4, M5 and/or M6 published by a plurality of publishing clients such as the publishing clients 230k to a distributed subscriptions client employing a subscription group 250C such as the subscription group 250 that comprises three shared subscriptions clients, 240C1, 240C2 and 240C3. The messages M1-M6 are associated with a topic the distributed subscriptions client is subscribed for and are therefore forwarded by the messaging engine 220 to the shared subscriptions clients 240C1, 240C2 and 240C3.

In case shared subscriptions are not applied in the system 300, i.e. the distributed subscriptions client subscribes to the messaging engine 220 through a single subscribing client 240, all messages M1-M6 would be forwarded to the distributed subscription client through the single subscribing client 240. This may overload the connection and/or the computation resources of the single subscribing client 240 thus reducing the message consumption capacity of the single subscribing client 240. However by employing the subscription group 250C, the distributed subscriptions client may receive the messages M1-M6 through a plurality of the shared subscriptions clients 240C1, 240C2 and/or 240C3 thus increasing the message consumption capacity. The messaging engine 220 forwards (dispatches) each message M in an alternating manner, such that each message M is sent only once and to only one of the members of the subscription group 250. For example, the messages M1 and M4 are forwarded through the shared subscriptions client 240C1, the messages M2 and M5 are forwarded through the shared subscriptions client 240C2 and the messages M3 and M6 are forwarded through the shared subscriptions client 240C3. The messaging engine(s) 220 are responsible for tracing each of the messages M to verify that each message is indeed forwarded to each of the subscribing clients 240 according to its subscription. The messaging engine(s) 220 also verify a single delivery of each message to the distributed subscriptions client(s) through one of the shared subscriptions clients 240 according to the subscription group(s) 250. In order to achieve this, the messaging engine(s) 220 may maintain a routing map defining one or more messages forwarding rules and/or directives. The forwarding rules and/or directives may be created and/or adjusted by the messaging engine(s) 220 according to the detected shared subscriptions made by shared subscription clients of each subscription group 250, for example, the subscription group 250C to the server 210_1. The messaging engine(s) 220 may detect the shared subscriptions by analyzing a unique identification (ID) assigned to each of the subscribing clients 240.

Figure 3B:
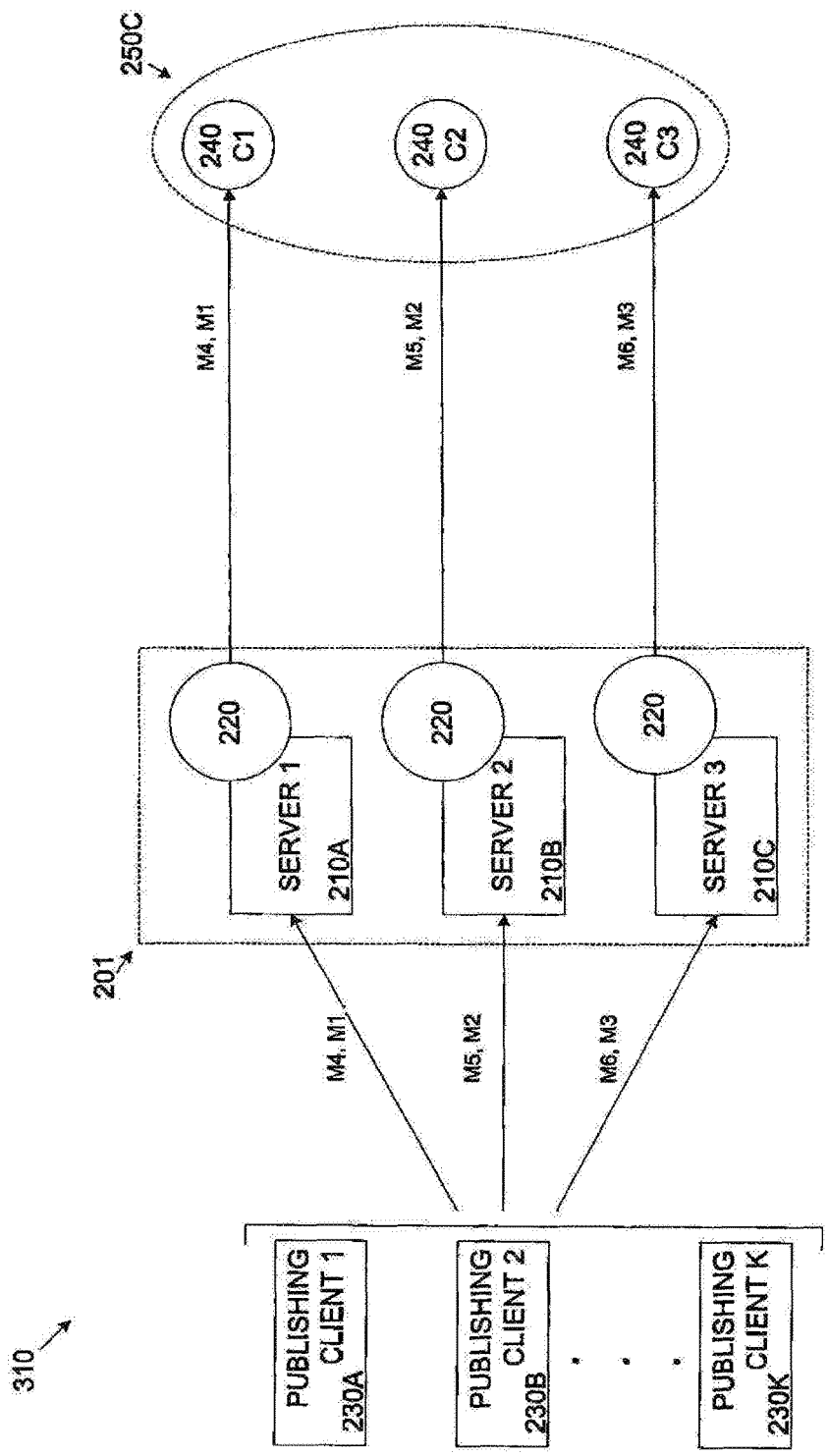
FIG. 3B is a schematic illustration of an exemplary publish-subscribe cluster system supporting shared subscriptions.

Reference is also made to FIG. 3B, which is a schematic illustration of an exemplary publish-subscribe cluster system supporting shared subscriptions. An exemplary publish-subscribe system 310 includes a publish-subscribe cluster such as the cluster 201 comprising one or more servers, for example, a server 210A, a server 210B and a server 210C such as the server 210 each executing one or more messaging engines such as the messaging engine 220. The messaging engines 220 forward the plurality of messages M1-M6 to the distributed subscriptions client employing the subscription group 250C comprising the shared subscriptions clients, 240C1, 240C2 and 240C3.

While in the system 300 all messages M1-M6 are published by the publishing clients 230k on the server 210_1, in the system 310 the messages M1-M6 may be published on any of the servers 210A, 210B and/or 210C according to the connections of the publishing clients 230k to the servers 210A-210C. As discussed before, by employing the shared subscription group 250C, the distributed subscriptions client may significantly increase its message consumption. However, for the publish-subscribe cluster 201, the efficiency of the publish-subscribe service may be significantly increased by distributing the shared subscriptions clients 240 over all the servers 210A-210C or at least over the relevant servers 210, i.e. achieving high server coverage for the subscription group 250C. The relevant servers 210 are the servers 210 on which messages are published that are associated with the topic(s) for which the shared subscriptions clients 240C1-240C3 are subscribed, for example the servers 210A-210C. For example, the shared subscriptions client 240C1 may connect to the messaging engine 220 executed by the server 210A, the shared subscriptions client 240C2 may connect to the messaging engine 220 executed by the server 210B and/or the shared subscriptions client 240C3 may connect to the messaging engine 220 executed by the server 210C. By achieving high server coverage, message transfer between the servers 210A-210C may be significantly reduced and/or completely avoided. Each of the servers 210A-210C may forward the messages locally published on its messaging engine(s) to the shared subscription client(s) connected to it. For example, the messaging engine(s) 220 executed by the server 210A may forward the messages M, for example, the message M1 and/or the message M4 published on it by one or more of the publishing clients 230k to the respective shared subscriptions client(s) 240, for example, the shared subscriptions client 240C1. Similarly, the messaging engine(s) 220 executed by the server 210B may forward the messages M2 and/or the message M5 to the respective shared subscriptions client 240C2 and the messaging engine(s) 220 executed by the server 210C may forward the messages M3 and/or the message M6 to the respective shared subscriptions client 240C3.

In order to properly trace delivery of the messages M to the shared subscriptions clients 240, for example, the shared subscriptions clients 240C1-240C3, the messaging engine(s) 220 may maintain the routing map defining one or more messages forwarding rules and/or directives. The forwarding rules and/or directives may be created and/or adjusted by the messaging engine(s) 220 according to the detected shared subscriptions made by shared subscription clients of each subscription group 250, for example, the subscription group 250C to each of the servers 210, for example, the servers 210A-210C. The messaging engine(s) 220 may detect the shared subscriptions by analyzing a unique identification (ID) assigned to each of the subscribing clients 240.

Reference is made once again to FIG. 1 and FIG. 2.

In some embodiments of the present invention, the publish-subscribe system 200 may be illustrated for an exemplary implementation for the MQTT, however the publish-subscribe system 200 may apply to a plurality of other publish-subscribe middleware and/or services as described herein above.

As the publish-subscribe service provided by the publish-subscribe cluster 201 is topic-based, the messages published at the publish-subscribe cluster 201 may be arranged by topics such that each message is classified (associated) to one of a plurality of topics. Each subscribing client 240 subscribes to one or more of the topics. The subscribing clients 240 may use wild-card topics and/or topic filters subscription(s) to extract messages of interest. For example, for MQTT, assuming there is a first topic $Topic/news/English and a second topic Topic/news/German, one or more of the subscribing clients 240 may apply a wild-card topic filter, for example, $Topic/news/* such that the messaging engine(s) 220 may forward all messages classified for both the topic $Topic/news/English and the topic Topic/news/German to the respective subscribing client(s) 240.

As shown at 102, the publish-subscribe cluster 201 provides a publish-subscribe service and/or middleware for the plurality of publishing clients 230 and the plurality of subscribing clients 240 through one or more of the messaging engines 220 executed by one or more of the servers (brokers) 210. The messaging engine(s) 220 forward (dispatch) the published messages to the subscribing clients 240 according to their subscriptions to the topics. The publish-subscribe cluster 201 forms a unified publish-subscribe domain such that a message published on a respective topic by one of the publishing clients 230k that may be connected to one of the servers 220, is forwarded to all the subscribing client(s) 240 subscribed to the respective topic, regardless of the server 210 the subscribing client(s) 240 are connected to. Each of the subscribing clients 240 may subscribe to the publish-subscribe cluster 201 using a unique identification (ID) identifying the respective subscribing client 240.

Since one or more of the subscribing clients 240 may be a distributed subscriptions client, for example, the fat pipe applications applying shared subscriptions using one or more subscription groups, for example, the subscription group 250A and/or the subscription group 250B, the messaging engine(s) 220 may be configured to send the messages in the alternating manner This means that the messaging engine(s) 220 may send each message only once to a respective distributed subscriptions client through one of its shared subscriptions clients.

The shared subscriptions may be defined by the standard (specification) of the publish-subscribe service provided by the publish-subscribe cluster 201, for example, the MQTT. In case the publish-subscribe cluster 201 provides the MQTT publish-subscribe service, each of the shared subscriptions clients 240 of a respective subscription group 250 may initiate the shared subscription using the following command and/or message:

$SharedSubscription/SubName/topicFilter

Where $SharedSubscription is a reserved prefix, SubName is the name of the subscription group and topicFilter is an MQTT topic filter.

For example, one of the distributed subscriptions clients may employ the subscription group 250A comprising the shared subscriptions clients 240A1, 240A2 and 240A3 through 240Am for subscribing to the publish-subscribe cluster 201. The shared subscriptions clients 240A1-240Am may use a SubName, for example, G1 to identify their subscription group 250A and a topicFilter, for example, news/golf. The shared subscriptions clients 240A1-240Am may therefore collectively consume a stream of messages matching the topicFilter, news/golf, where each of the messages is forwarded by the messaging engine(s) 220 to only one of the shared subscriptions clients 240A1-240Am. As another example, one of the distributed subscriptions clients (could be the same one employing the subscription group 250A or a different one) may employ the subscription group 240B comprising the shared subscriptions clients 240B1, 240B2, 240B3 and 240B4 through 240Bn for subscribing to the publish-subscribe cluster 201. The shared subscriptions clients 240B1-240Bn may use another Sub- Name, for example, G2 to identify their subscription group and a topicFilter that may be different and/or the same as the topicFilter, news/golf. Assuming the shared subscriptions clients 240B1-240Bn use the same topicFilter, news/golf, the shared subscriptions clients 240B-240Bn may therefore collectively consume a stream of messages matching the topicFilter, news/golf, where each of the messages is forwarded by the messaging engine(s) 220 to only one of the shared subscriptions clients 240B1-240Bn.

As shown at 104, the messaging engine(s) 220 monitors a plurality of subscriptions made by the plurality of shared subscriptions clients, in particular the messaging engine(s) 220 monitor shared subscriptions made, for example, by the subscription groups 250A and/or 250B. The messaging engine(s) 220 may identify one or more of a plurality of shared subscriptions events, for example, a topic to which the shared subscriptions are made, a server to which the shared subscriptions are made, an additional shared subscriptions client, a removed shared subscriptions client and/or the like.

As shown at 106, the messaging engine(s) 220 may generate the shared subscriptions information indicating one or more of the detected shared subscriptions events. The shared subscriptions information may indicate, for example, a distribution of shared subscriptions made to one or more topics per server 210, a distribution of shared subscriptions made by a respective subscription group 250A and/or 250B per server 210, an identity of the shared subscriptions clients 240, a name of the distributed subscriptions client and/or the like. The shared subscriptions information may include, for example, a shared subscription topic(s), a number of shared subscriptions made per topic per server, a number of shared subscriptions made by each subscription group per server, a number of shared subscriptions made by each subscription group per server per distributed subscriptions client name, message consumption load information, queuing information and/or the like.

As shown at 108, the messaging engine(s) 220 may publish the shared subscriptions information over the publish-subscribe service, for example, as system topics. The shared subscriptions system topics may be available to any subscribing client 240 that subscribes to the publish-subscribe cluster 201. For example, in case the publish-subscribe cluster 201 provides MQTT, the system topics may be identified by the reserved prefix of $SYS/. In MQTT, the system topics may typically be used for system monitoring purposes, for example, memory utilization, number of messages received/dispatched, number of connected subscribing clients 240 and/or 230 and/or the like. Publishing the additional set of system topics for the shared subscriptions information to the subscribing clients 240 may be used by one or more of the subscribing clients, in particular the shared subscriptions client(s) 240 that are part of a respective subscription group 250 applied by a respective distributed subscriptions client, for example, the shared subscriptions clients 240Am and/or 240Bn, to improve the distribution of the respective subscription group clients over the plurality of servers 210.

The shared subscriptions information may include, for example, a cluster membership identifying the server(s) 210 of the publish-subscribe cluster 201. In order to expose the availability of the servers 210 in the publish-subscribe cluster 201, a membership system topic is defined to create a server membership view. In some embodiment in which the publish-subscribe cluster 201 provides the MQTT, the membership system topic may be defined as $SYS/Cluster/Membership. The messaging engine(s) 220 may create and/or maintain records in the membership system topic to keep an updated view of the publish-subscribe cluster 201, for example, in case one or more servers 210 are added and/or removed from the publish-subscribe cluster 201. The records may include one or more fields each indicating an endpoint ID and/or access information for one or more endpoints in each of the servers 210, for example, a server name, a server ID, a domain, an Internet Protocol (IP) address, a port and/or the like. The set of record(s) published in the membership system topic may be represented in one or more machine readable formats, for example JavaScript Object Notation (JSON), Extensible Markup Language (XML) and/or the like.

The membership system topic may be implemented in the MQTT in a plurality of formats. For example, subscribing to the membership system topic such as, for example, $SYS/Cluster/Membership may yield the following message:

```
{servers: [
    {ID: "210A",
        Name: "210A",
        endpoints: [{address: "10.10.10.10", port: "33333"}]
    },
    {ID: "210A",
        Name: "210B",
        endpoints: [{address: "10.10.10.11", port: "33334"}]
    },
    {ID: "210L",
        Name: "210L",
        endpoints: [{address : "10.10.10.13", port : "33335"},
            {address: "11.11.11.13", port : "33335"}]
    },
]}
```

Where ID denotes each of the servers 210 in the publish-subscribe cluster, the name denotes the name assigned to the respective server 210 and endpoints denotes the endpoints (access points) through which the subscriptions may be made to the respective server 210, including the IP address(es) and/or the port(s) number.

Exposing the membership system topic to the shared subscriptions clients 240, may allow one or more of the shared subscriptions clients 240 to identify the deployment of the publish-subscribe cluster 201 and the servers 210 to which the shared subscriptions clients 240 may subscribe (connect).

The shared subscriptions information may also include information describing coverage of one or more subscription groups 250 applied for shared subscriptions by one or more distributed subscriptions clients. The shared subscriptions coverage may indicate a number of subscriptions made by the shared subscriptions client(s) 240 that are part of a respective subscription group 250, for example, the shared subscriptions clients 240A1-240Am, the clients 240B1-240Bn and/or the like. Naturally, as there may be a plurality of subscription groups, each of the subscription group(s) may be designated with a subscription name, for example, a SubName. For the MQTT, a SharedSubCoverage system topic may be defined as $SYS/Cluster/SharedSubCoverage/<SubName> Such that each subscription group 250 is assigned a different <SubName>. The messaging engine(s) 220 may create and/or maintain records in the SharedSubCoverag system topic to keep an updated shared subscriptions "map" that maps the number of subscriptions made by shared subscriptions clients 240 of each subscription group 250 to each of the servers 210.

The SubName system topic may be implemented in the MQTT in a plurality of formats. For example, subscribing to a shared subscriptions coverage system topic, such as, for example, $SYS/Cluster/SharedSubCoverage/250A may yield the following message:

```
{subName: "250A",
serverCoverage: [
    {ID: "210A", numSubscribers: "10"},
    {ID: "210B", numSubscribers: "5"},
    {ID: "210L", numSubscribers: "0"} ] }
```

Where ID denotes the server 210 to which the shared subscriptions are made and numSubscribers denotes the number of shared subscriptions made by the shared subscriptions clients 240Am that are members of the subscription group 250A.

As another example, subscribing to another shared subscriptions coverage system topic, such as, for example, $SYS/Cluster/SharedSubCoverage/250B may yield the following message:

```
{subName: "250B",
serverCoverage: [
    {ID: "210A", numSubscribers: "0"},
    {ID: "210B", numSubscribers: "3"},
    {ID: "210L", numSubscribers: "6"} ] }
```

Using the topic $SYS/Cluster/Membership and the topic $SYS/Cluster/SharedSubCoverage/<SubName>, one or more of the shared subscriptions clients 240 may employ simple heuristics to select a server 210 to connect to in order to improve the distribution of the respective subscription group 250 over the servers 210, i.e. improving the server coverage. One or more of the shared subscriptions clients 240 may further use these system topics to appropriately distribute the subscription group over the messaging engines 220 at the servers 210 according to the load of subscription on each messaging server 220. For example, in case there is a load of shared subscriptions of a respective subscription group 250 on a specific messaging server 220 at a specific server 210, one or more of the shared subscriptions clients 240 of the respective subscription group 250 may divert to a less loaded messaging server 220 at another server 210 by disconnecting from the currently connected messaging server 220 and connect to the less loaded messaging server 220.

One or more of the shared subscriptions clients 240 that needs to select one or more of the messaging servers 220 to connect to, may subscribe to the Membership system topic and the SharedSubCoverage system topic for one or more subscription groups (SubName tags) the shared subscriptions client(s) 240 is a member of. One or more shared subscriptions clients 240 of a respective subscription group 250, may then connect to the messaging server 220 at a server 210 that is least covered by other shared subscriptions clients of the respective subscription group 250. For example, a shared subscriptions client 240Am of the subscription group 250A may identify that no other shared subscriptions clients 240Am of this subscription group 250 are currently connected to the server 210 "210L" and may therefore connect to the server 210L in order to improve the server coverage of the subscription group 250A. As another example, a shared subscriptions client 240Bn of the subscription group 250B may identify that no clients 240Bn of this subscription group 250B are currently connected to the server 210A and may therefore connect to this server 210A in order to improve the server coverage of the subscription group 250B.

Using the Membership system topic and the SharedSubCoverage system topic per subscription groups (SubName) may be of major benefit in particular for MQTT deployments in which the distributed subscriptions clients use a limited (small) number of subscription groups 250 (SubName tags) and/or when the set of subscription groups 250 (SubName tags) is mutually exclusive among different distributed subscriptions clients.

In order to further assist the subscribing clients 240 to improve the sever coverage of their subscription group(s) the shared subscriptions information collected by the messaging engine(s) 220 may further describe coverage of shared subscriptions clients 240 per distributed subscriptions client name. This may serve to overcome inconvenience and/or complications arising when the distributed subscriptions client(s) use many subscription groups 250 (SubName tags). The shared subscriptions client coverage information per distributed subscriptions client name may also be of benefit when several different distributed subscriptions client use an overlapping set of subscription group names (SubName tags) that may prevent an efficiently achieving the server coverage.

For the MQTT, an AppCoverage system topic may be defined as $SYS/Cluster/AppCoverage/<AppID> Such that each distributed subscriptions client is assigned a different AppID. The messaging engine(s) 220 may create and/or maintain records in the AppCoverage system topic to keep an updated shared subscriptions "map" that maps the number of subscriptions made by shared subscriptions clients 240 of each subscription group 250 employed by each distributed subscriptions client to each of the servers 210.

It is assumed that each of the shared subscriptions clients 240 that connects to the publish-subscribe cluster 201 identifies the distributed subscriptions client, for example, an application it belongs to (an instance of) using a prefix of the client-id. For example, the client-id field may be of the following structure: <T>:<Org>:<AppName>:<instance-id>, where T is the distributed subscriptions client type, for example, the handling application type, Org is the organization name, AppName is the distributed subscriptions client name, for example, the handling application name, and instance-id is a unique suffix assigned to each of the instances of the handling application. The AppID may therefore be defined as AppID=<T>:<Org>:<AppName>. For example, assuming a distributed subscriptions client, for example, an application LightControl is of type A, such that T='A' deployed in the organization 'IBM', such that Org='IBM' and applies shared subscriptions to the publish-subscribe cluster 201. Each of the shared subscriptions clients 240 of the handling application LightControl may therefore be identified by a client ID, for example, ClientID=A:IBM:LightControl:123.

The AppID system topic may be implemented in the MQTT in a plurality of formats. For example, subscribing to a shared subscriptions coverage per application system topic, such as, for example, $SYS/Cluster/AppCoverage/LightControl may yield the following message:

```
{AppID: "A:IBM:LightControl",
serverCoverage: [
    {ID: "210A", numSubscribers: "0"},
    {ID: "210B", numSubscribers: "3"},
    {ID: "210L", numSubscribers: "6"} ] }
```

A shared subscriptions client 240 that needs to select one or more messaging servers 220 at the server(s) 210 to connect to, may subscribe to the Membership system topic and the AppCoverage system topic corresponding with its name, for example, $SYS/Cluster/AppCoverage/LightControl. One or more shared subscriptions client 240 (used by instances of a respective distributed subscriptions client) that are members of a respective subscription group 250 employed by the respective distributed subscriptions client may then connect to the server 210 that is least covered by other instances of the respective distributed subscriptions client. For example, an shared subscriptions client 240 initiated by an instance of the handling application LightControl may identify that no shared subscriptions clients 240 initiated by other instances of the handling application LightControl are currently connected to the server 210A and may therefore connect to this server 210 in order to improve the server coverage of the handling application LightControl.

It should be noted that in order to facilitate the AppCoverage system topic it is assumed that multiple topicFilter(s) may not be applied for the same subscription group 250 (SubName). This is restriction may be of little significance since this restriction may typically be enforced by the server(s) 210 as part of typical MQTT and/or other publish-subscribe services middleware deployments.

Optionally, the shared subscriptions coverage system topics, for example, the SharedSubCoverage system topic and/or the AppCoverage system topic may be further augmented to expose additional coverage information to the subscribing clients 240, in particular the shared subscriptions clients 240. The shared subscriptions clients 240 may use the additional coverage information while selecting the server 210 to connect to in order to improve the server coverage. The additional coverage information may include, for example, load information and/or the like. The load information may be expressed as, for example, queuing information indicating the average and/or maximal queue length. The load information may be used by one or more of the shared subscriptions clients 240, for example, the shared subscriptions clients 240Am to appropriately distribute over the plurality of servers 210 in order to balance the message consumption according to the load of messages on each of the servers 210. The queuing information may be calculated, for example, per subscription group 250, per distributed subscriptions client and/or the like. The queuing information may be collected by measuring the queue for each message stream associated with each subscription group 250, distributed subscriptions client and/or the like over a pre-defined time interval. For example, for the MQTT, a SharedSubLoad system topic providing load information per subscription group 250 (SubName) may be defined as $SYS/Cluster/SharedSubLoad/<SubName>. The messaging engine(s) 220 may create and/or maintain records in the SharedSubLoad system topic to keep an updated load information per server 210 available to the shared subscriptions clients 240.

The SharedSubLoad system topic may be implemented in the MQTT in a plurality of formats. For example, subscribing to a shared subscriptions coverage system topic, such as, for example, $SYS/Cluster/+/250A may yield the following message:

{subName: "250A",
  serverCoverage: [
    {ID: "210A", numSubscribers: "10"},
    {ID: "210B", numSubscribers: "5"},
    {ID: "210L", numSubscribers: "5"} ],
  serverLoad: [
    {ID: "210A", queueLength: "0"},
    {ID: "210B", queueLength: "1"},
    {ID: "210L", queueLength: "100"} ] }

This information may be used by the shared subscriptions clients 240 to select the server 210 to connect to in order to improve the load balancing of their subscription group 250. As shown in the exemplary message above, the server 210L has a long queue that may indicate, for example, that the shared subscriptions clients 240Am of the subscription group 250A subscribed to the server 210L are not consuming their incoming messages fast enough. Based on the information provided by this exemplary message, one or more of the shared subscriptions 240Am subscription group 250A, may decide to take one or more actions to overcome the insufficient message consumption at the server 210L. For example, the one or more shared subscriptions clients 240A (instances) may be added to the server 210L in order to increase consumption of the incoming messages. Additionally and/or alternatively, one or more of the shared subscriptions 240Am may divert from one or more of the other servers 210, for example, the server 210A and/or the server 210B to the server 210L in order to increase consumption of the incoming messages. Since the load on the server(s) 210 may dynamically change in order to avoid frequent update of the load information, the messaging engine(s) 220 may be configured to update the load information per one or more pre-defined conditions, for example, a pre-defined threshold level, a pre-defined change value and/or the like.

In some embodiments of the present invention, the messaging engine(s) 220 may publish one or more of the shared subscription information system topics such as, for example, the Membership, the SharedSubCoverage, the AppCoverage and/or the SharedSubLoad regularly with fixed time intervals. Alternatively, the messaging engine(s) 220 may publish the system topic(s) only when a change takes place. One or more criteria may be defined for identifying the changes that may require updating the shared subscriptions information published through the system topics.

The system topic messages published by the messaging engine(s) 220 may be retained messages as defined, for example, by the MQTT to allow one or more newly connected shared subscriptions clients 240 to subscribe to one or more of the system topics in order to retrieve the latest shared subscriptions information published through the system topic(s). Optionally, on subscription to one of the system topics, the first message sent to the shared subscriptions client 240 may be the latest records and/or messages published in the respective system topic.

One or more of the shared subscriptions clients 240 may drop and reconnect at any time. In order to maintain its server coverage, the shared subscriptions clients 240 may need to constantly monitor the shared subscriptions information published through the system topics, for example, the AppCoverage system topic and take corrective action(s) in case of, for example, under-coverage of one or more of the servers 210. In case, for example, the coverage on one or more of the servers 210 drops below a pre-defined threshold, one or more of the shared subscriptions clients 240 may decide to disconnect from their current server 210 and reconnect to one of the under-covered server(s) 210 in order to improve the server coverage of its subscription group 250 and/or its distributed subscriptions client. In order to avoid a scenario in which too many shared subscriptions clients 240 divert to the same under-coverage server 210, the shared subscriptions clients 240 may randomly select to disconnect and reconnect using, for example, a probability p calculation, for example, $$p = \frac{1}{\text{number of clients}}.$$

It is possible that a plurality of shared subscriptions clients 240 may try to connect substantially at the same time to the publish-subscribe cluster 201. This may lead to a sub-optimal selection of the server 210 to connect to since the shared subscriptions clients 240 may not be coordinated among themselves while using the same shared subscriptions information available at the time of connection. This may lead, for example, to a scenario in which a plurality of shared subscriptions clients 240 of the same subscription group 250 connect to the same server 210 that is determined to be the preferred server 210 to connect based on the shared subscriptions information. However, once the plurality of shared subscriptions clients 240 connect to the preferred server, the distribution of the respective subscription group 250 may significantly change and become sub-optimal once again, for example, with respect to message consumption load balancing. In order to improve the server coverage of the respective subscription group 250 the shared subscriptions clients 240 may employ randomization for selecting the server 210 to connect to. For example, assuming one of the shared subscriptions clients 240 of the handling application LightControl subscribes to the exemplary system topic $SYS/Cluster/AppCoverage/A:IBM:LightControl and receives, for example, the following message:

```
{AppID: "A:IBM:LightControl",
 serverCoverage: [
     {ID: "210A", numSubscribers: "0"},
     {ID: "210B", numSubscribers: "0"},
     {ID: "210L", numSubscribers: "6"} ] }
```

The shared subscriptions clients 240 may select randomly between the server 210A and the server 210B that present similar coverage by the subscription group 250 employed by the handling application (distributed subscriptions client) LightControl.

It is expected that during the life of a patent maturing from this application many relevant publish-subscribe methodologies will be developed and the scope of the term publish-subscribe is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A computer implemented method of improving server coverage of a publish-subscribe cluster of servers by publishing shared subscriptions information to a plurality of clients, comprising:
   using a cluster comprising a plurality of servers each having at least one hardware processor, said cluster is adapted to:
       execute, on said plurality of servers, a plurality of messaging engines of a publish-subscribe service for forwarding a plurality of messages to a plurality of subscribing clients, each of said plurality of messages is associated with one of a plurality of topics, wherein at least one subset of shared subscriptions clients of said plurality of subscribing clients are members of at least one subscription group initiated by at least one distributed subscriptions client to subscribe for at least one of said plurality of topics;
       monitor a plurality of shared subscriptions made by said at least one subscription group to each of said plurality of messaging engines for said at least one topic;
       generate a shared subscriptions information for said at least one topic by analyzing said plurality of shared subscriptions; and
       publish said shared subscriptions information to said plurality of clients, at least one shared subscriptions client of said subset uses the shared subscriptions information for selecting a preferred messaging engine of said plurality of messaging engines to subscribe for said at least one topic in order to improve a server coverage of said at least one subscription group.

2. The computer implemented method of claim 1, wherein each of said plurality of messages is received by said plurality of messaging engines from at least one publishing client which is a member selected from a group consisting of: a device and a publishing application.

3. The computer implemented method of claim 1, wherein said at least one distributed subscriptions client subscribes to at least one of said a plurality of messaging engines through said at least one subscription group in order to increase a message consumption of said at least one distributed subscriptions client.

4. The computer implemented method of claim 1, wherein said at least one distributed subscriptions client is a fat pipe application consuming a large number of said plurality of messages.

5. The computer implemented method of claim 1, wherein each shared subscriptions client of said subset is an application instance of said at least one distributed subscriptions client.

6. The computer implemented method of claim 1, wherein said publish-subscribe service supports subscription using a wildcard topic filter in which only a portion of the topic may be used by at least one of said subscribing clients to subscribe to a plurality of topics sharing said portion.

7. The computer implemented method of claim 1, wherein said publish-subscribe service is an MQTT (Message Queue Telemetry Transport) service used for a plurality of Internet of Things (IoT) applications.

8. The computer implemented method of claim 1, wherein said shared subscriptions information is published through at least one retained system topic to be available to a newly subscribed subscribing client of said plurality of subscribing clients.

9. The computer implemented method of claim 1, wherein said shared subscriptions information includes cluster membership information indicating which of said plurality of servers is a member of said cluster.

10. The computer implemented method of claim 1, wherein said shared subscriptions information includes a subscription name (subname) information indicating a number of current subscriptions of said at least one subscription group to each of said plurality of messaging engines for said each topic.

11. The computer implemented method of claim 1, wherein said subscription information further comprising an application subscription information indicating a number of current shared subscriptions of said at least one subscription group to each of said plurality of messaging engines for said each topic.

12. The computer implemented method of claim 11, wherein each client of said at least one subscription group subscribes to one of said plurality of messaging engines using a client identification information constructed of at least one of a plurality of identification sub-fields to assign a unique identification to said each client.

13. The computer implemented method of claim 12, wherein each of said plurality of sub-fields is a member of a group consisting of: an application type, an organization name, an application name and an application instance identification number.

14. The computer implemented method of claim 1, wherein at least one of said subscribing clients of said at least one subscription group selects said preferred messaging engine by employing at least one heuristics computation method.

15. The computer implemented method of claim 1, wherein said subscription information comprising a load information indicating a load of messages associated with said at least one topic for said at least one subscription group for each of said plurality of messaging engines.

16. The computer implemented method of claim 15, wherein at least one subscribing client of said at least one subscription group subscribes to one of said plurality of messaging engines according to said load information to balance said load of messages over said plurality of messaging engines.

17. A system for improving server coverage of a publish-subscribe cluster of servers by publishing shared subscriptions information to a plurality of clients, comprising:
 a cluster comprising a plurality of servers each having at least one hardware processor adapted for executing code stored in a program store, said code comprising:
  code instructions for executing, on said plurality of servers, a plurality of messaging engines of a publish-subscribe service for forwarding a plurality of messages to a plurality of subscribing clients, each of said plurality of messages is associated with one of a plurality of topics, wherein at least one subset of shared subscriptions clients of said plurality of subscribing clients are members of at least one subscription group initiated by at least one distributed subscriptions client is subscribed to at least some of said plurality of messaging engines to subscribe for at least one of said plurality of topics;
  code instructions for monitoring a plurality of shared subscriptions made by said at least one subscription group to each of said plurality of messaging engines for said at least topic;
  code instructions for generating a shared subscriptions information for said at least one topic by analyzing said plurality of shared subscriptions; and
  code instructions for publishing said shared subscriptions information to said plurality of subscribing clients, at least one of shared subscriptions client of said subset uses the shared subscriptions information for selecting a preferred messaging engine of said plurality of messaging engines to subscribe for said at least one topic in order to improve a server coverage of said at least one subscription group.

18. A computer program product for improving server coverage of a publish-subscribe cluster of servers by publishing shared subscriptions information to a plurality of clients, comprising:
 a non-transitory computer readable storage medium;
  first program instructions for executing, on a cluster comprising a plurality of servers, a plurality of messaging engines of a publish-subscribe service for forwarding a plurality of messages to a plurality of subscribing clients, each of said plurality of messages is associated with one of a plurality of topics, wherein at least one subset of shared subscriptions clients of said plurality of subscribing clients are members of at least one subscription group initiated by at least one distributed subscriptions client to subscribe for at least one of said plurality of topics;
  second program instructions for monitoring a plurality of shared subscriptions made by said at least one subscription group to each of said plurality of messaging engines for said at least one topic;
  third program instructions for generating a shared subscriptions information for said at least one topic by analyzing said plurality of shared subscriptions; and
  fourth program instructions for publishing said shared subscriptions information to said plurality of clients, at least one shared subscriptions client of said subset uses the shared subscriptions information for selecting a preferred messaging engine of said plurality of messaging engines to subscribe for said at least one topic in order to improve a server coverage of said at least one subscription group;

wherein said first, second, third and fourth program instructions are executed by at least one processor of said cluster from said non-transitory computer readable storage medium.

* * * * *